(12) United States Patent
Hiranuma et al.

(10) Patent No.: US 8,117,830 B2
(45) Date of Patent: Feb. 21, 2012

(54) EXHAUST PURIFICATION DEVICE FOR ENGINE

(75) Inventors: Satoshi Hiranuma, Kawasaki (JP);
Yoshinaka Takeda, Kawasaki (JP);
Hiroaki Fujita, Kawasaki (JP); Shinichi Saito, Kawasaki (JP); Yasuko Suzuki, Kawasaki (JP); Yuji Mitsui, Kawasaki (JP); Norihiro Kajimoto, Kawasaki (JP); Fumio Aoki, Yokohama (JP); Hayato Aizawa, Yokohama (JP)

(73) Assignees: Mitsubishi Fuso Truck and Bus Corporation (JP); Tokyo Roki Co., Ltd. (JP)

( * ) Notice: Subject to any disclaimer, the term of this patent is extended or adjusted under 35 U.S.C. 154(b) by 602 days.

(21) Appl. No.: 12/342,135

(22) Filed: Dec. 23, 2008

(65) Prior Publication Data

US 2009/0165447 A1    Jul. 2, 2009

(30) Foreign Application Priority Data

Dec. 27, 2007    (JP) .................................. 2007-336648

(51) Int. Cl.
*F01N 3/00*    (2006.01)
*F01N 3/10*    (2006.01)
(52) U.S. Cl. ................ 60/286; 60/295; 60/303
(58) Field of Classification Search ........... 60/286
See application file for complete search history.

(56) References Cited

U.S. PATENT DOCUMENTS

| | | | | |
|---|---|---|---|---|
| 1,709,333 | A * | 4/1929 | Webb, Sr. | 181/259 |
| 6,449,947 | B1 * | 9/2002 | Liu et al. | 60/286 |
| 6,536,420 | B1 * | 3/2003 | Cheng | 123/590 |
| 2008/0296903 | A1 * | 12/2008 | Todorof | 290/55 |

FOREIGN PATENT DOCUMENTS

| | | | | |
|---|---|---|---|---|
| JP | 2002205502 | A | * | 7/2002 |
| JP | 2006-29233 | A | | 2/2006 |
| JP | 2006029233 | A | * | 2/2006 |

OTHER PUBLICATIONS

English translation of JP 2006-029233A.*

* cited by examiner

*Primary Examiner* — Thomas Denion
*Assistant Examiner* — Jason Shanske
(74) *Attorney, Agent, or Firm* — Rossi, Kimms & McDowell LLP

(57) ABSTRACT

An agitating device for agitating the exhaust gas of an engine includes a base plate having a plurality of through holes that are defined by radially extending spoke portions and a ring-like rim portion and are arranged in a circular pattern in a circumferential direction of the base plate, and a plurality of fins expanding from the respective spokes on a slant with respect to the base plate. The base plate is fixed in the exhaust passage by the rim portion being jointed to the exhaust passage at welded portions. The welded portions are each disposed in an area between respective two adjacent spoke portions in the circumferential direction of the base plate, and an outer edge of the rim portion positioned on the outer side of the rim portion in extending directions of the spoke portions is located next to the exhaust passage with a gap provided therebetween.

10 Claims, 12 Drawing Sheets

EXHAUST PURIFICATION DEVICE FOR ENGINE

BACKGROUND OF THE INVENTION

1. Field of the Invention

The present invention relates to an exhaust purification device for an engine, and more specifically, to an exhaust purification device in which a reducing agent injected by reducing-agent supply means is supplied to an after-treatment device together with exhaust gas agitated by agitating means.

2. Description of the Related Art

Some exhaust purification devices for removing harmful components contained in exhaust gas by using a reducing agent of the above-mentioned type are provided, for example, with selective reduction-type NOx catalysts (hereinafter, referred to as SCR catalysts). An exhaust purification device with an SCR catalyst is disclosed, for example, in Unexamined Japanese Patent Application Publication No. 2006-29233 (hereinafter, referred to as Document 1).

In the exhaust purification device of Document 1, an oxidizing catalyst is interposed in the exhaust passage of the engine, and the SCR catalyst is set downstream of the oxidizing catalyst. In an exhaust pipe connecting the oxidizing catalyst and the SCR catalyst, there is disposed an injection nozzle that injects urea-water as a reducing agent. A fin device is also disposed in the exhaust pipe on the upstream side of the injection nozzle.

The fin device is fabricated by press-molding a disk-shaped steel base plate. This base plate is arranged in the exhaust pipe to divide the exhaust pipe into upstream and downstream sides. In the base plate, a plurality of fins, which are arranged around the axis of the base plate, are formed by being bent to be raised from the base plate at predetermined angles in a downstream direction. At the same time, through holes with shapes matching with their respective fins are accordingly formed in the base plate. The fin device guides the exhaust gas that has passed through the through holes along the inclinations of the fins, and thus creates a swirl flow in the exhaust gas. The urea-water injected from the injection nozzle is diffused into the exhaust gas by this swirl flow.

In the exhaust purification device thus configured, exhaust pressure is constantly applied onto the base plate of the fin device, so that the base plate needs to be firmly fixed within the exhaust pipe. For example, the outer circumference of the base plate is welded within the exhaust pipe at regular intervals. FIG. 13 is an enlarged partial view of the fin device of Document 1 as viewed from an exhaust upstream side. In this example, a fin device 101 is disposed in a position of a flange 13a formed in the exhaust pipe. The outer circumference of a base plate 22 is welded to the flange 13a at places toward which spoke portions 24 supporting fins 23 extend. Weld beads 32 are formed in these places.

The exhaust purification device is exposed to exhaust heat during engine operation and greatly rises in temperature compared with a cold state of the engine. Arrival temperature is varied, depending upon the members constructing the exhaust purification device. For example, in the case of the exhaust purification device installed in a vehicle, a casing that accommodates the oxidizing catalyst and the SCR catalyst is cooled by outside air, and is also exposed to the running wind, depending upon its installation location. For these reasons, a temperature rise in such an exhaust purification device is small. At the same time, the oxidizing catalyst and the SCR catalyst accommodated inside are not cooled by the outside air, and are therefore remarkably increased in temperature. Such a temperature gap is a favorable phenomenon when the catalysts should be kept at activation temperatures.

However, a similar tendency can be seen in the exhaust pipe and the fin device. In other words, the arrival temperature of the exhaust pipe cooled by the outside air is relatively low, whereas the arrival temperature of the fin device located inside is much higher than that of the exhaust pipe. Especially in the configuration illustrated in FIG. 13, the flange 13a having large cooling area is suppressed in temperature rise by the outside air. In result, a temperature gap between the flange 13a and the fin device 101 is enlarged.

In addition, if a DPF (diesel particulate filter) for collecting particulates contained in exhaust gas is set upstream of the fin device 101, during the forcible regeneration in which the particulates are burned by feeding the unburned fuel to the DPF, the fin device 101 located downstream of the DPF is increased in temperature by being applied with the heat of the DPF raised in temperature. In this case, the temperature gap is further enlarged.

For example, when the DPF is forcibly regenerated in a configuration where the fin device 101 is disposed at the flange 13a of the exhaust pipe, the flange 13a has a temperature in a range of from about 300 to about 400 degrees centigrade, whereas the temperature of the fin device 101 located inside rises up to about 600 degrees centigrade. Because of this temperature gap, the flange 13a and the fin device 101 are significantly different from each other in thermal expansion. Compared to the exhaust pipe and the flange 13a, which form the outer shell of the exhaust purification device, a steel plate forming the fin device 101 that changes an exhaust gas flow is thin and low in rigidity. The fin device 101 is thermally expanded in a state constrained in its outer circumference by the exhaust pipe and the flange 13a. This causes the problem that the stress produced during thermal expansion is concentrated on the center of the fin device 101 and the like, and then that the fin device 101 is damaged by so-called thermal stress.

SUMMARY OF THE INVENTION

An aspect of the present invention is directed to an exhaust purification device for an engine, comprising: an after-treatment device interposed in an exhaust passage of an engine for purifying exhaust gas of the engine by using a reducing agent; reducing-agent supply means for supplying a reducing agent into the exhaust passage on an upstream side of the after-treatment device; and agitating means interposed in the exhaust passage to be located upstream from the after-treatment device for agitating the exhaust gas of the engine by changing a flow direction of the exhaust gas that is passing through the agitating means, wherein the agitating means comprises a base plate having a plurality of through holes that are defined by radially extending spoke portions and a ring-like rim portion connecting outer ends of the spoke portions, and are arranged in a circular pattern in a circumferential direction of the base plate, the base plate being fixed in the exhaust passage by the rim portion being jointed to the exhaust passage at welded portions; and a plurality of fins that expand in one arranging direction of the through holes from base ends that are first edges of the spoke portions in the one arranging direction on a slant with respect to the base plate, and change a flow direction of the exhaust gas passing through the through holes to agitate the exhaust gas, wherein the welded portions are each disposed in an area between respective two adjacent spoke portions in the circumferential direction of the base plate; and an outer edge of the rim portion positioned on an outer side of the rim portion in extending directions of the spoke portions is located next to the exhaust passage with a gap provided therebetween.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An exhaust purification device for an engine according to a first embodiment of the invention will be described below in details with referenced to the attached drawings.

Figure 1:
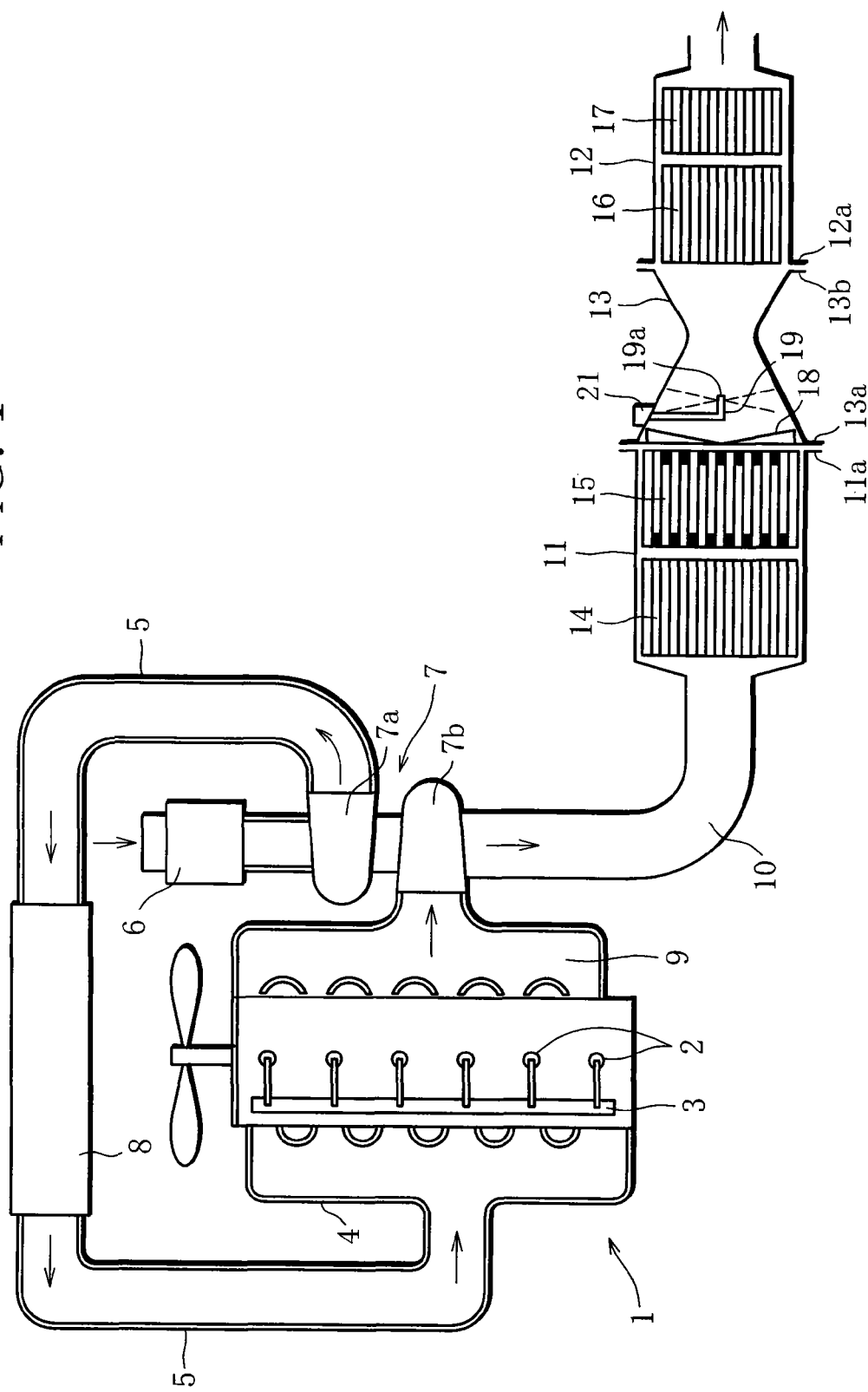
FIG. 1 is a view showing the entire configuration of an exhaust purification device for an engine according to embodiments of the present invention.

FIG. 1 is a view showing the entire configuration of the exhaust purification device for an engine according to the present embodiment. An engine 1 is constructed of a four-cycle in-line six-cylinder diesel engine. A fuel injection valve 2 is provided to each cylinder of the engine 1. The fuel injection valves 2 are supplied with pressurized fuel from a common rail 3 commonly provided to the cylinders. The fuel injection valves 2 are opened with timing appropriate to an operational state of the engine 1 to inject the fuel into the cylinders.

An intake manifold 4 is mounted on an intake side of the engine 1. In an intake passage 5 connected to the intake manifold 4, there are interposed an air cleaner 6, a compressor 7a of a turbocharger 7, and an intercooler 8, in the order from upstream to downstream. An exhaust manifold 9 is mounted on an exhaust side of the engine 1. An exhaust passage 10 is connected to the exhaust manifold 9 through a turbine 7b of the turbocharger 7 which is mechanically connected to the compressor 7a.

During the operation of the engine 1, intake air that is introduced through the air cleaner 6 into the intake passage 5 is pressurized by the compressor 7a of the turbocharger 7. The pressurized intake air is distributed to the cylinders through the intercooler 8 and the intake manifold 4, and then introduced into the cylinders during intake strokes of the cylinders. The fuel is injected from the fuel injection valves 2 into the cylinders with designated timing, and ignites and combusts in the vicinity of a compression top dead center. The exhaust gas produced after the fuel combustion is emitted outside through the exhaust manifold 9 and the exhaust passage 10. At this time, the exhaust gas drives to rotate the turbine 7b of the turbocharger 7.

The exhaust purification device is interposed in the exhaust passage 10. The exhaust purification device includes an upstream casing 11, a downstream casing 12, and a mixing chamber 13 located in between the casings 11 and 12. The upstream casing 11, the downstream casing 12, and the mixing chamber 13 construct a part of the exhaust passage 10. The upstream casing 11 contains a pre-stage oxidizing catalyst 14, and also accommodates a DPF (diesel particulate filter) 15 downstream of the pre-stage oxidizing catalyst 14. The downstream casing 12 contains a selective reduction-type NOx catalyst (hereinafter, referred to as SCR catalyst) 16 corresponding to an after-treatment device of the invention, and also accommodates a post-stage oxidizing catalyst 17 downstream of the SCR catalyst 16.

The mixing chamber 13 is reduced in diameter of a middle portion along an exhaust flow direction, and as a whole, has a shape of a venturi. To be more concrete, the mixing chamber 13 is tapered in diameter toward the downstream direction from its upstream end connected to a downstream end of the upstream casing 11, and is then broaden toward the downstream casing 12 to be connected to an upstream end of the downstream casing 12. A fin device (agitating means) 18 is situated at an uppermost stream position in the mixing chamber 13. The fin device 18 will be later described in detail.

An injection nozzle (reducing-agent supply means) 19 is disposed in the mixing chamber 13 so as to be located downstream of the fin device 18. The injection nozzle 19 extends from an outer surface of a circumferential wall of the mixing chamber 13 toward the center of the mixing chamber 13. A tip end 19a of the injection nozzle 19 is directed to an exhaust downstream side at the center of the mixing chamber 13. The injection nozzle 19 is supplied with urea-water with predetermined pressure from a urea-water tank, not shown, through an electromagnetic valve 21 that is set in the outer surface of the circumferential wall of the mixing chamber 13. The injection nozzle 19 radially injects the urea-water from an injection hole formed through the tip end 19a of the injection nozzle 19 toward the circumferential inner wall of the mixing chamber 13 according to the opening/closing of the electromagnetic valve 21. Although details will be omitted, the electromagnetic valve 21 of the injection nozzle 19, the fuel injection valves 2 of the engine 1 and the like are driven by a control device, not shown.

Figure 2:
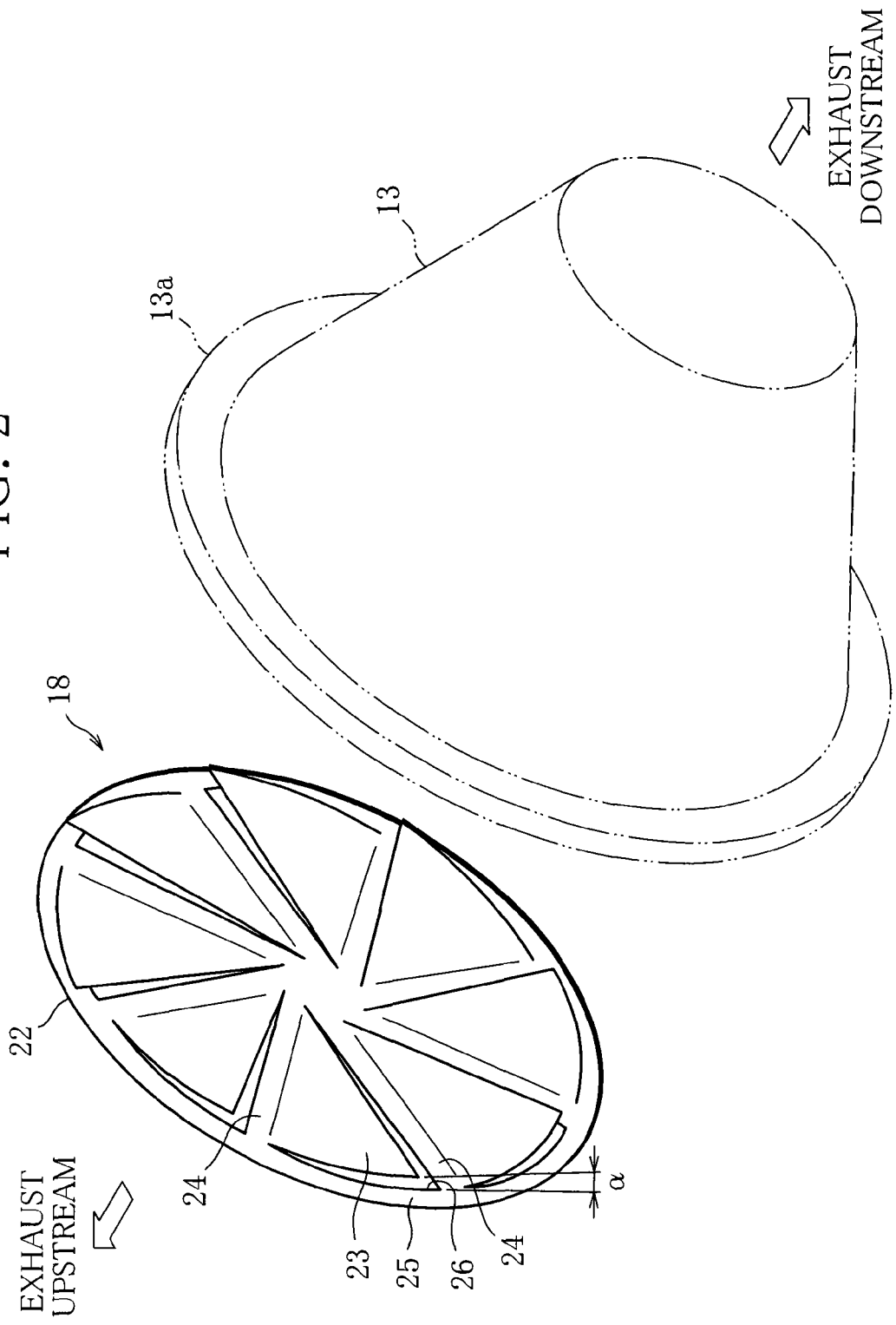
FIG. 2 is an exploded perspective view of a fin device and a mixing chamber according to a first embodiment, as viewed from an exhaust downstream side.
Figure 3:
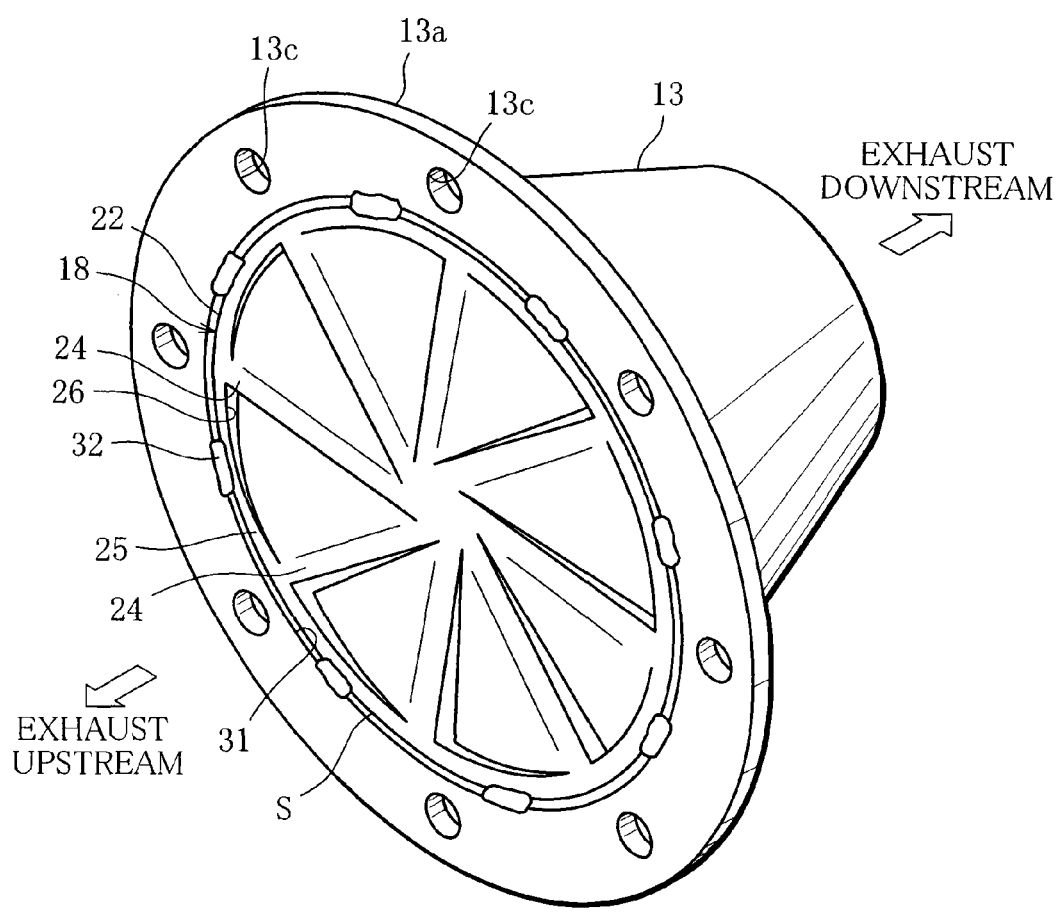
FIG. 3 is an assembled perspective view of the fin device and the mixing chamber according to the first embodiment, as viewed from an exhaust upstream side.

FIG. 2 is an exploded perspective view of the fin device 18 and the mixing chamber 13 according to the present embodiment, as viewed from the exhaust downstream side. FIG. 3 is an assembled perspective view of the fin device 18 and the mixing chamber 13, as viewed from an exhaust upstream side.

As illustrated in FIG. 1, the downstream end of the upstream casing 11 is connected to the upstream end of the mixing chamber 13 through flanges 11a and 13a. A downstream end of the mixing chamber 13 and an upstream end of the downstream casing 12 are also connected to each other through flanges 13b and 12a. FIG. 3 shows the flange 13a located upstream of the mixing chamber 13. As illustrated in FIG. 3, the flange 13a is fitted to the mating flange 11a with bolts and nuts, both not shown, by using many bolt holes 13c aligned in a circumferential direction of the flange 13a. The flanges 13b and 12a have the same fitting structure.

The fin device 18 is fabricated into a disk as a whole by press-molding a steel base plate 22 with plate thickness t. On the base plate 22, a plurality of fan-like fins 23 are arranged at regular intervals in a circumferential direction of the base plate 22 around an axis of the base plate 22. Spoke portions 24 are each formed in the respective two adjacent fins 23 to extend in a radial direction of the base plate 22.

The spoke portions 24 each have an outer end that is connected to a rim portion 25 forming an outer circumference of the base plate 22 in a shape of a ring with predetermined width. Inner ends of the spoke portions 24 are connected to one another at the center of the base plate 22. The spoke portions 24 are arranged so as not to extend in directions passing through the center of the base plate 22, but to extend in directions slightly off the center of the base plate 22 by equal amounts. Edges of the fins 23, which run in the radial direction of the base plate 22, accordingly do not extend in directions passing through the center of the base plate 22, but extend in directions slightly off the center of the base plate 22 by equal amounts. However, the spoke portions 24 may extend in directions passing through the center of the base plate 22.

Each of the fins 23 continues from a corresponding spoke portion 24 positioned on a first side in the circumferential direction of the base plate 22 with respect to the fin 23 through the base ends of the fin 23. At the same time, during the press-molding, each of the fins 23 is cut off from a corresponding spoke portion 24 positioned on a second side in the circumferential direction of the base plate 22 with respect to the fin 23 and also from the rim portion 25 located on an outer circumference side of the fin 23. Each of the fins 23 is formed, during the press-molding, by being bent from the corresponding spoke portions 24 positioned on the first side at the same angles toward the exhaust downstream side so that the edge of the fin 23 on the second side is detached from the base plate 22. The angles of the fins 23 with respect to the base plate 22 are each set at α (degrees) as shown in FIG. 2. At the same time as the bending of the fins 23, through holes 26 are formed in the base plate 22. The through holes 26 each have a fan-like shape corresponding to the shape of each of the fins 23. The upstream casing 11 communicates with the mixing chamber 13 through the through holes 26.

Figure 4:
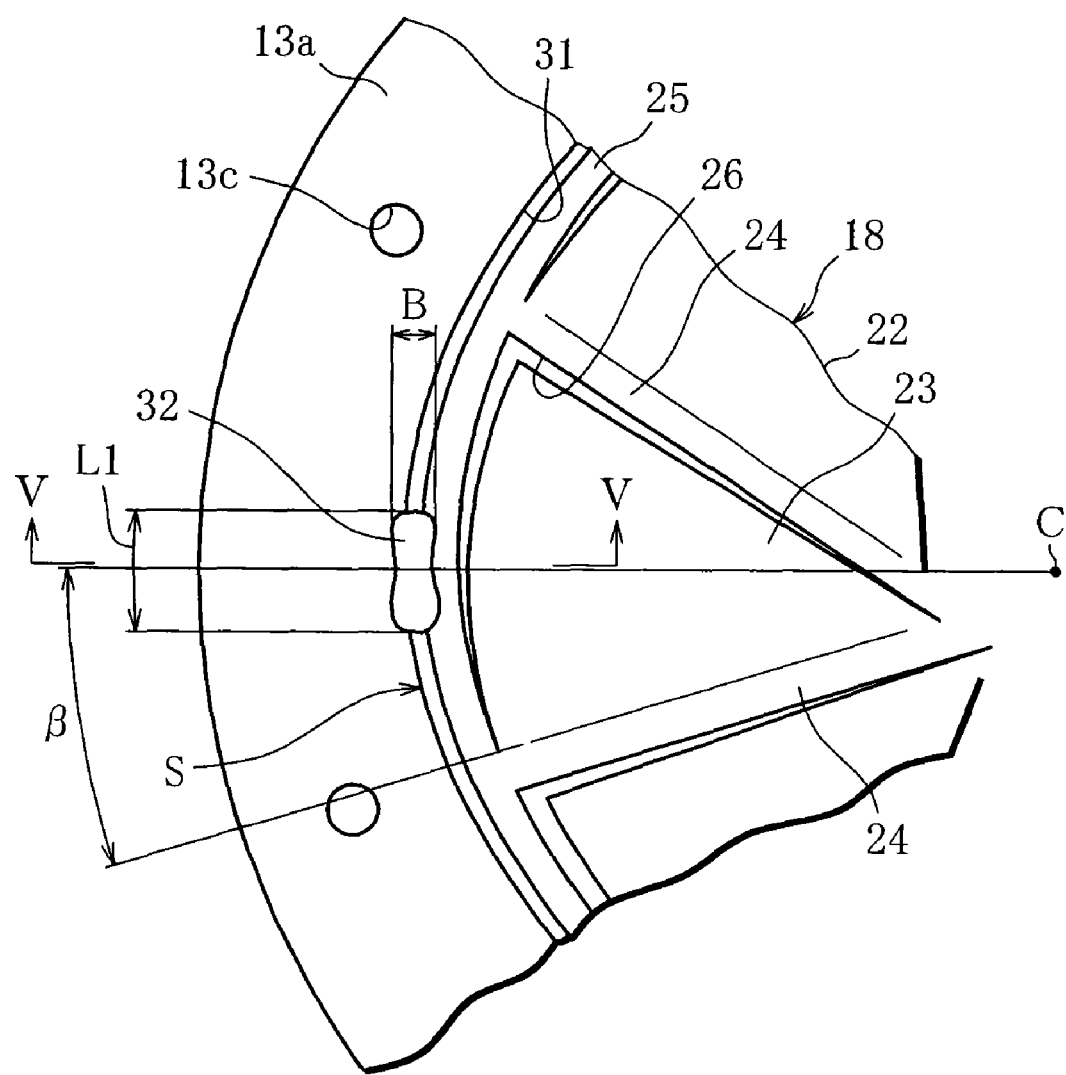
FIG. 4 is an enlarged partial view of the fin device according to the first embodiment, as viewed from the exhaust upstream side.
Figure 5:
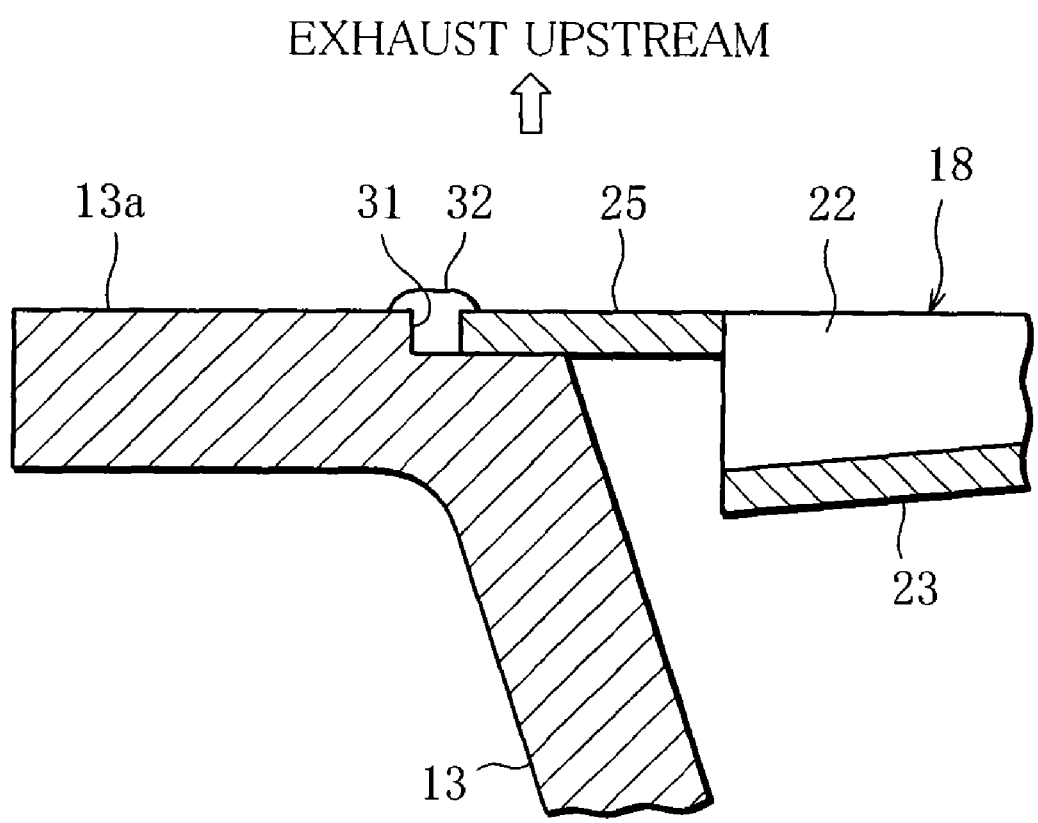
FIG. 5 is a sectional view showing the details of a weld bead, taken along line V-V in FIG. 4.

FIG. 4 is an enlarged partial view of the fin device 18 as viewed from the exhaust upstream side. FIG. 5 is a sectional view showing the details of a weld bead, taken along line V-V in FIG. 4.

As illustrated in FIGS. 3 to 5, a ring-like step portion 31 with an internal diameter that is slightly larger than an external diameter of the fin device 18 is formed in the flange 13a located upstream of the mixing chamber 13 so that the ring-like step portion 31 is arranged with its center on the axis of the mixing chamber 13. The ring-like step portion 31 has depth that is substantially equal to the plate thickness of the base plate 22 of the fin device 18. The base plate 22 of the fin device 18 is disposed inside the ring-like step portion 31 so as to cover an opening of the upstream end of the mixing chamber 13. A narrow gap S is formed in between an outer circumferential edge of the rim portion 25 of the base plate 22 and an inner circumference of the ring-like step portion 31 to extend through the entire circumference.

The rim portion 25 of the fin device 18 is welded to the flange 13a of the mixing chamber 13 at eight positions corresponding to positions located in the substantially middle position of the respective two circumferentially adjacent spoke portions 24. The reason that the fin device 18 is disposed in the position of the flange 13a corresponding to the upstream end of the mixing chamber 13 is to facilitate the welding work of the fin device 18 during the production process of the exhaust purification device and to inspect the fin device 18 without difficulty at the time of regular maintenance thereafter.

Regarding a further detail of welds of the fin device 18, as illustrated in FIGS. 4 and 5, a weld bead (welded portion) 32 of each of the welds has width B that is designed to extend from the rim portion 25 of the fin device 18 through the ring-like step portion 31 to the flange 13a of the mixing chamber 13. The weld beads 32 fix the fin device 18 within the ring-like step portion 31 in a state filling the gap S between the outer circumferential edge of the rim portion 25 of the base plate 22 and the inner circumference of the ring-like step portion 31.

A central position of each of the weld beads 32 in the circumferential direction of the fin device 18 is set at angle β (degrees) from the spoke portion 24 on the first side of the corresponding fin 23 (namely, the spoke portion 24 on a base-end side of the fin) around an axis C of the fin device 18. The weld beads 32 each have length L1 that is designed as a circumferential dimension that is divided evenly on either circumferential side at a middle position based on the angle β.

In the present embodiment, the width and angle β of the weld bead 32 are set at B and 22.5 degrees, respectively. The length L of the weld bead 32 is set at 20 mm that is divided equally into two 10-mm parts on either side at the middle position based on the angle β. Consequently, the rim portion 25 of the fin device 18 is fixed to the ring-like step portion 31 of the flange 13a by the weld beads 32 in the substantially middle positions between the respective two circumferentially adjacent spoke portions 24 (that is, areas including the middle portions between the respective two adjacent spoke portions 24). Except for where the weld beads 32 are placed, the outer circumferential edge of the rim portion 25 is detached from the ring-like step portion 31 with the gap S provided therebetween.

Function of the thus constructed exhaust purification device for the engine 1 will be described below.

The exhaust gas of the engine 1 is guided into the upstream casing 11 through the exhaust manifold 9, the compressor 7a of the turbocharger 7, and the exhaust passage 10. When the exhaust gas passes through the pre-stage oxidizing catalyst 14 and the DPF 15 within the upstream casing 11, particulates contained in the exhaust gas are collected in the DPF 15. The exhaust gas then flows down while being distributed to the through holes 26 of the fin device 18 to be introduced into the mixing chamber 13.

At this time, the exhaust gas collides with the fins 23 immediately after passing through the through holes 26. The exhaust gas is thus changed in a flowing direction according to fin angle α. In result, the exhaust gas creates a swirl flow around the axis C of the mixing chamber 13 within the mixing chamber 13. The urea-water is injected from the injection nozzle 19 into this exhaust gas. The swirl flow of the exhaust gas is shrunk and enlarged again according to a change in sectional area of the mixing chamber 13. Due to this change of the swirl flow, the urea-water is well diffused into the exhaust gas. Urea contained in the urea-water diffused within the mixing chamber 13 is hydrolyzed by exhaust heat and vapor contained in the exhaust gas, to thereby produce $NH_3$. The produced $NH_3$ is used as a reducing agent to reduce NOx contained in the exhaust gas into harmless $N_2$ in the SCR catalyst 16. The exhaust gas is purified in this manner. Any excess $NH_3$ unused in this process is removed from the exhaust gas by the post-stage oxidizing catalyst 17.

As stated in the "BACKGROUND OF THE INVENTION," the exhaust purification device is exposed to exhaust heat during engine operation, so that the device is greatly increased in temperature compared with the cold state. There is a great temperature gap between the mixing chamber 13 that is cooled by the outside air and the fin device 18 that is accommodated in the mixing chamber 13 and is therefore free from the cooling influence of the outside air. In result, due to a difference in thermal expansion between the mixing chamber 13 and the fin device 18, the fin device 18 constrained by the mixing chamber 13 in the outer circumferential edge is influenced by thermal stress.

Particularly in the present embodiment, the fin device 18 is disposed at the flange 13a of the mixing chamber 13, which has large cooling area, and the temperature of the flange 13a shifts to a lower temperature side. At the same time, since the DPF 15 is located upstream of the fin device 18, during forcible regeneration in which unburned fuel is fed to the DPF 15 to burn particulates, the fin device 18 situated downstream of the DPF 15 is applied with the heat of the DPF 15 raised in temperature. The temperature of the fin device 18 then shifts to a higher temperature side. These factors enlarge the temperature gap between the flange 13a and the fin device 18, and increase concern that the fin device 18 may be damaged by thermal stress.

Figure 13:
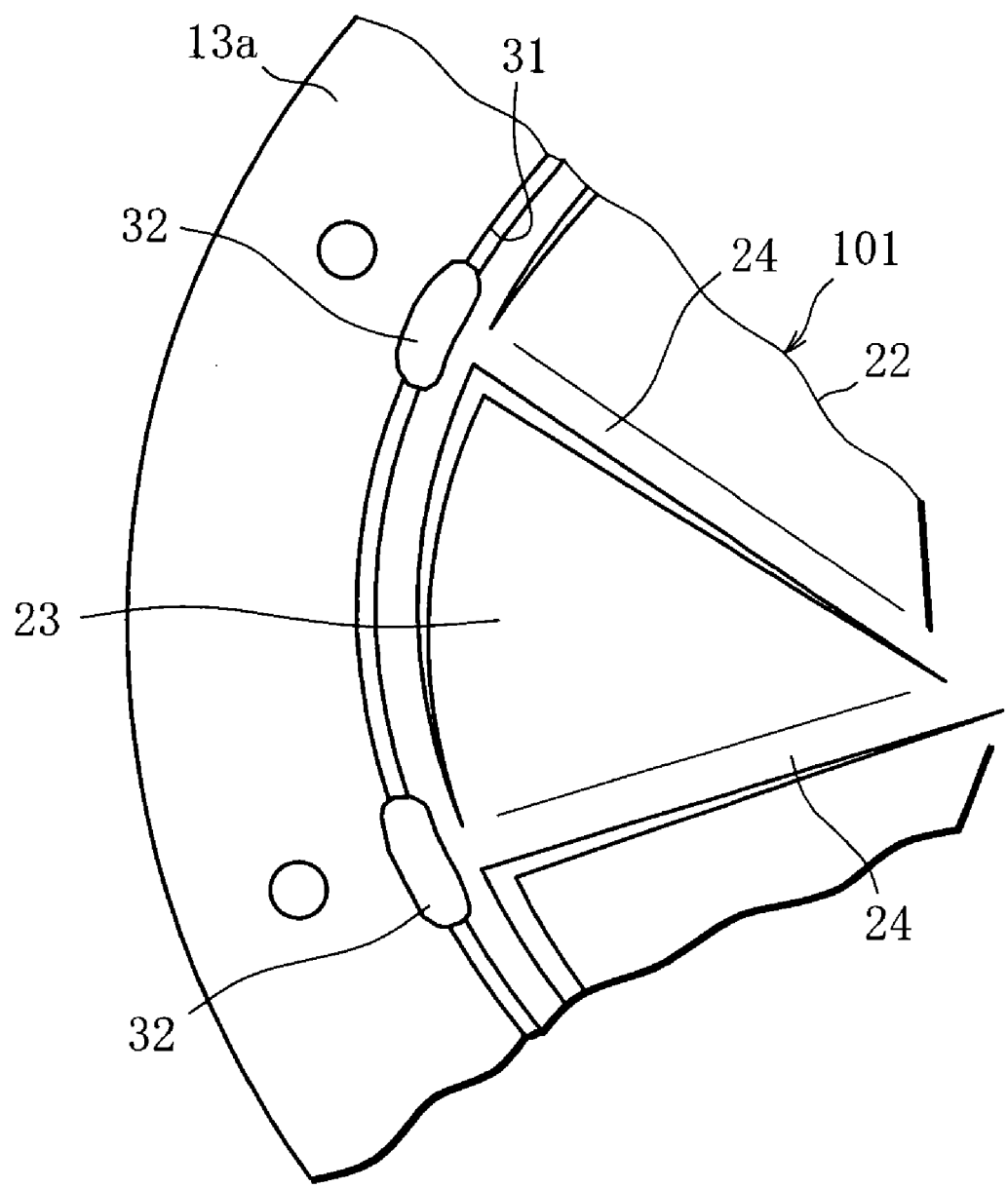
FIG. 13 is an enlarged partial view of the fin device of conventional art, as viewed from the exhaust upstream side.

The inventors focused attention on the fact that a generation state of thermal stress of the fin device 18 changed according to the positions of the weld beads 32 in the outer circumferential edge of the base plate 22. According to the technology of Document 1, which is shown in FIG. 13, in order to firmly fix a fin device 101 to the flange 13a of the exhaust passage, the weld beads 32 are arranged in positions corresponding to the spoke portions 24 securing a radial strength of the base plate 22. Thermal expansion of the fin device 101, which is caused by exhaust heat, takes place when the spoke portions 24 stretch in a radial direction with the fins 23 arranged in the circumferential direction. If the above-mentioned weld positions are employed, radially outer ends of the spoke portions 24 directly press the inner circumference of the ring-like step portion 31 of the flange 13a. The spoke portions 24 then receives a reaction force, and stress is focused at the center of the base plate 22 through the spoke portions 24, which damages the fin device 101.

In order to avoid such phenomenon, it is required to prevent the spoke portions 24 from directly pressing the inner circumference of the ring-like step portion 31 of the flange 13a. To that end, in the present embodiment, the base plate is arranged so as to form the gap S between the outer circumferential edge of the rim portion 25 of the base plate 22 and the inner circumference of the ring-like step portion 31, and each of the weld beads 32 is arranged so as to connect the rim portion 25 of the fin device 18 to the ring-like step portion 31 of the flange 13a in a substantially middle position between the respective two circumferentially adjacent spoke portions 24. Because of such a configuration, the rim portion 25 of the fin device 18 is fixed to the ring-like step portion 31 of the flange 13a by the weld beads 32 in a farthest position from the spoke portions 24. The outer circumferential edge of the rim portion 25, except for where the weld beads 32 exist, is detached from the inner circumference of the ring-like step portion 31 with the gap provided therebetween.

When the spoke portions 24 stretch in the radial direction with the fins 23 due to exhaust heat, the rim portion 25 is pressed by the spoke portions 24 and bows in the outward direction within the gap S between the rim portion 25 and the ring-like step portion 31, to thereby absorb the thermal expansion of the spoke portions 24. This modifies the concentration of stress at the center of the base plate 22, which is applied by the spoke portions 24 that have received a reaction force, and prevents the fin device 18 from being damaged by the concentration of stress. Especially in the present embodiment, since each of the weld beads 32 is arranged in the substantially middle position between the respective two circumferentially adjacent spoke portions 24, the rim portion 25 easily bows and effectively absorbs the thermal expansion of the spoke portions 24 when the rim portion 25 is pressed by the spoke portions 24. It is then possible to reliably modify the concentration of stress at the center of the base plate 22.

For the purpose of verifying advantages that can be achieved by the above-described positioning of the weld beads 32, the inventors carried out a simulation test on the basis of an analysis model. The test makes comparison between the fin device 101 of Document 1, in which the weld beads 32 are disposed in the positions corresponding to the spoke portions 24, and the fin device 18 of the embodiment, in which each of the weld beads 32 is disposed in the substantially middle position between the respective two circumferentially adjacent spoke portions 24. Specifications and test results of the fin devices 18 and 101 are shown together in TABLE 1. The comparison of the test results is shown in a graph of FIG. 6.

TABLE 1

|  | Positions of weld beads | L2 (mm) | L3 and L4 (mm) | Thermal stress (%) | Natural frequency (%) | Surface pressure stress (%) |
| --- | --- | --- | --- | --- | --- | --- |
| Conventional Art | Vicinity of spoke portions | 0 | — | 100 | 100 | 100 |
| First embodiment | Between two spoke portions | 0 | — | 15 | 75 | 119 |
| Second embodiment | Between two spoke portions | 30 | L3 = 5.2 (26%) | 42 | 114 | 79 |
| Third embodiment | Between two spoke portions | 30 | L4 = 10.75 (54%) | 57 | 137 | 75 |

Figure 6:
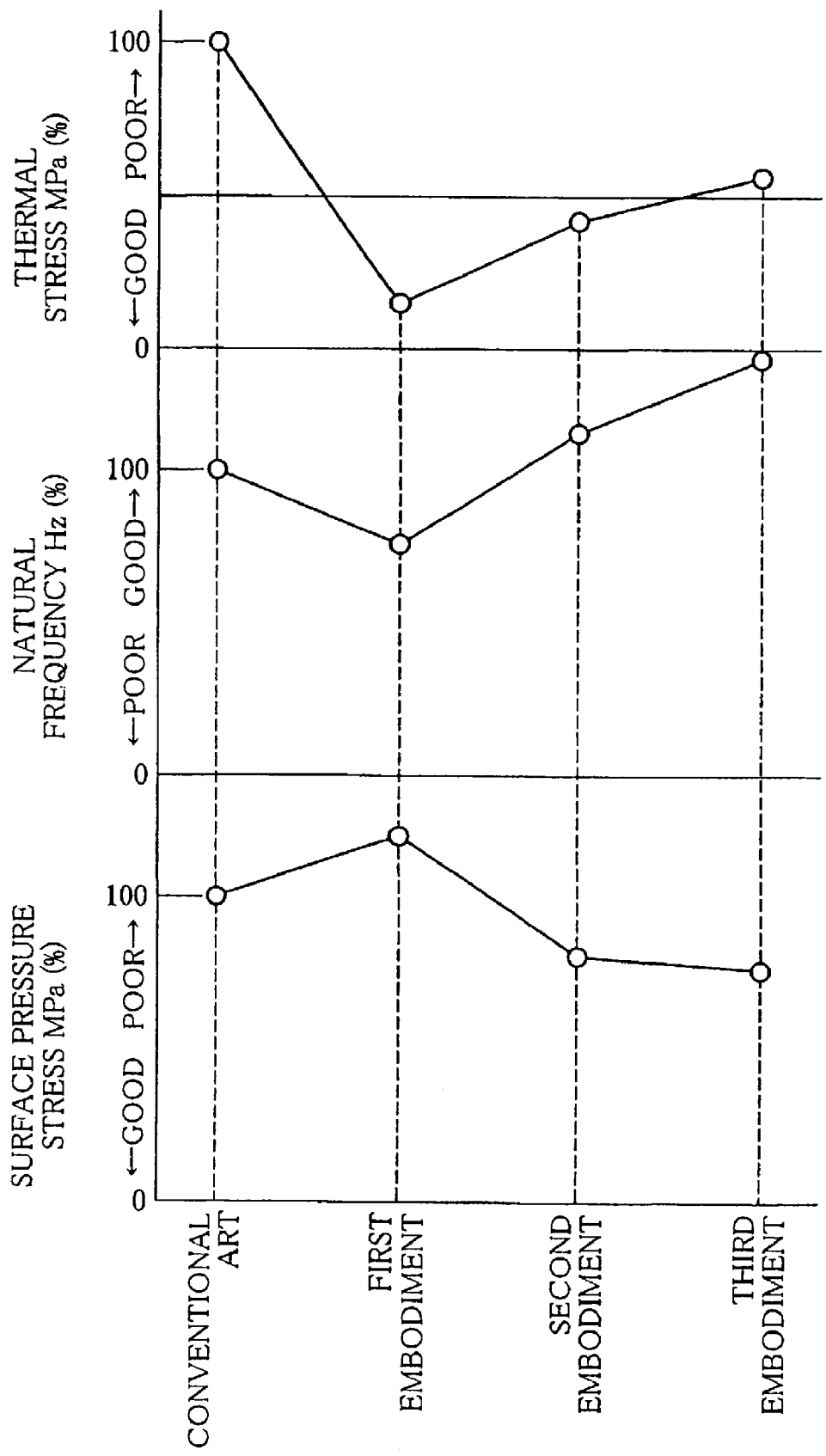
FIG. 6 is a graph showing specifications and test results of a fin device of conventional art and fin devices of the embodiments.

In TABLE 1 and FIG. 6, the fin device 101 of Document 1 is indicated as "Conventional Art," and the fin device 18 of the embodiment as "First embodiment." The only difference in specifications of these fin devices is the positioning of the weld beads 32. The "Second embodiment" and the "Third embodiment" will be described later.

The thermal stress here means the stress generated in the center of the base plates 22 of the fin devices 18 and 101 when the base plates 22 are thermally expanded. The natural frequency is a primary natural frequency of the fins 23. The surface pressure stress is the stress generated in the vicinity of the base ends of the fins 23 on the outermost circumference side due to a reaction force created when the exhaust gas is guided. A unit of the thermal stress and surface pressure stress obtained in the simulation test is MPa, and that of the natural frequency is Hz. However, TABLE 1 and FIG. 6 show the thermal stress, the surface pressure stress, and the natural frequency in the form of proportions of the embodiments when the conventional art is 100.

As shown in TABLE 1 and FIG. 6, the thermal stress at the center of the base plate 22 is drastically reduced in the first embodiment, as compared to the conventional art. This test result, too, verifies the phenomenon in which the bowing of the rim portion 25 absorbs the expansion of the spoke portions 24 and then modifies the concentration of stress at the center of the base plate 22.

With reference to TABLE 1 and FIG. 6, the natural frequencies of the fins 23 show a slight decrease while the stress caused by surface pressure is a little increased in the first embodiment, as compared to the conventional art. The natural frequencies are indexes related to resonance of the fins 23 of the fin devices 18 and 101. If a pulsation frequency of the exhaust gas, which affects the fin devices 18 and 101, coincides with the natural frequencies of the fins 23, there is concern that the fins 23 are damaged due to the resonance. It is therefore desirable that the fins 23 have high natural frequencies.

The stress caused by surface pressure is generated in the vicinity of the base ends of the fins 23 on the outermost circumference side because of the reaction force that is created when the fins 23 of the fin devices 18 and 101 guide the exhaust gas. Needless to say, it is desirable that the surface pressure stress be low to prevent the damage of the fins 23.

By comparing the natural frequencies and the surface pressure stress individually, one cannot make a quick decision that they become factors for the damage of the fins 23. The exhaust purification device of the present embodiment is particularly advantageous in terms of thermal stress by changing the positions of the weld beads 32 of the conventional art. However, the first embodiment is somewhat disadvantageous in terms of natural frequency and surface pressure stress. The second embodiment will be described below as an embodiment that solves the problem.

The entire configuration of the exhaust purification device of the second embodiment is the same as that of the first embodiment shown in FIG. 1. Differences from the first embodiment are seen in the configuration of the fin device 18. In the following description, constituents identical to those of the first embodiment are provided with identical reference marks, and explanations thereof will be omitted. The description will refer mainly to differences from the first embodiment with reference to FIGS. 7 to 11.

Figure 7:
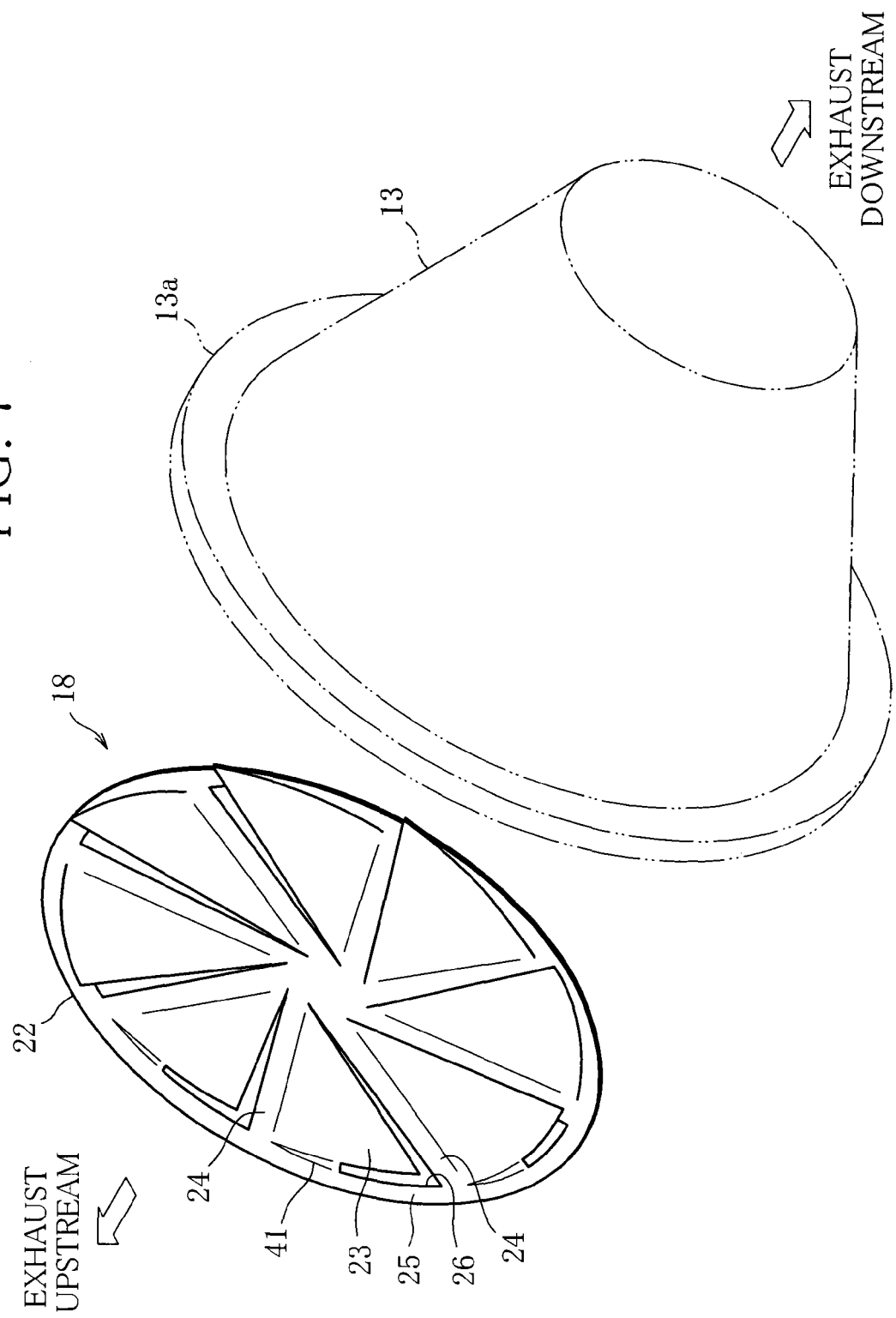
FIG. 7 is an exploded perspective view of the fin device and a mixing chamber according to a second embodiment, as viewed from the exhaust downstream side.
Figure 8:
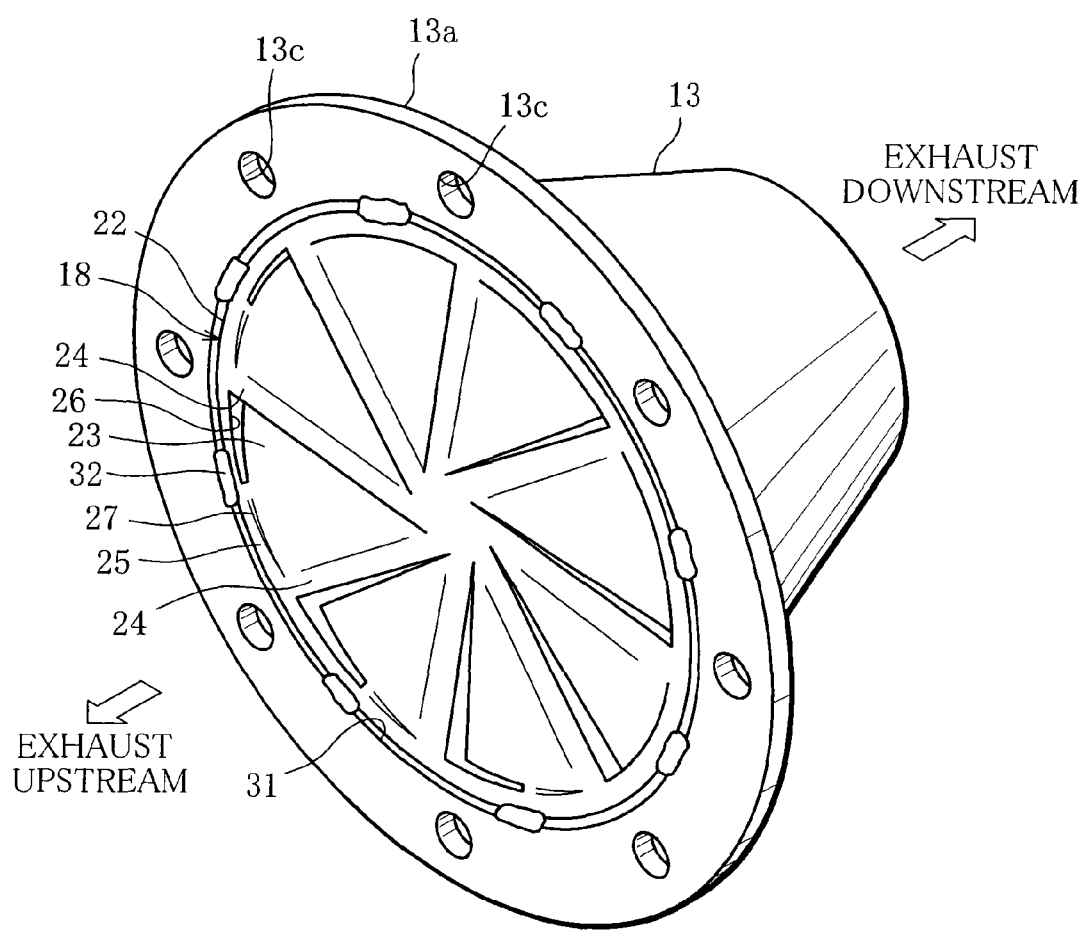
FIG. 8 is an assembled perspective view of the fin device and the mixing chamber according to the second embodiment, as viewed from the exhaust upstream side.
Figure 9:
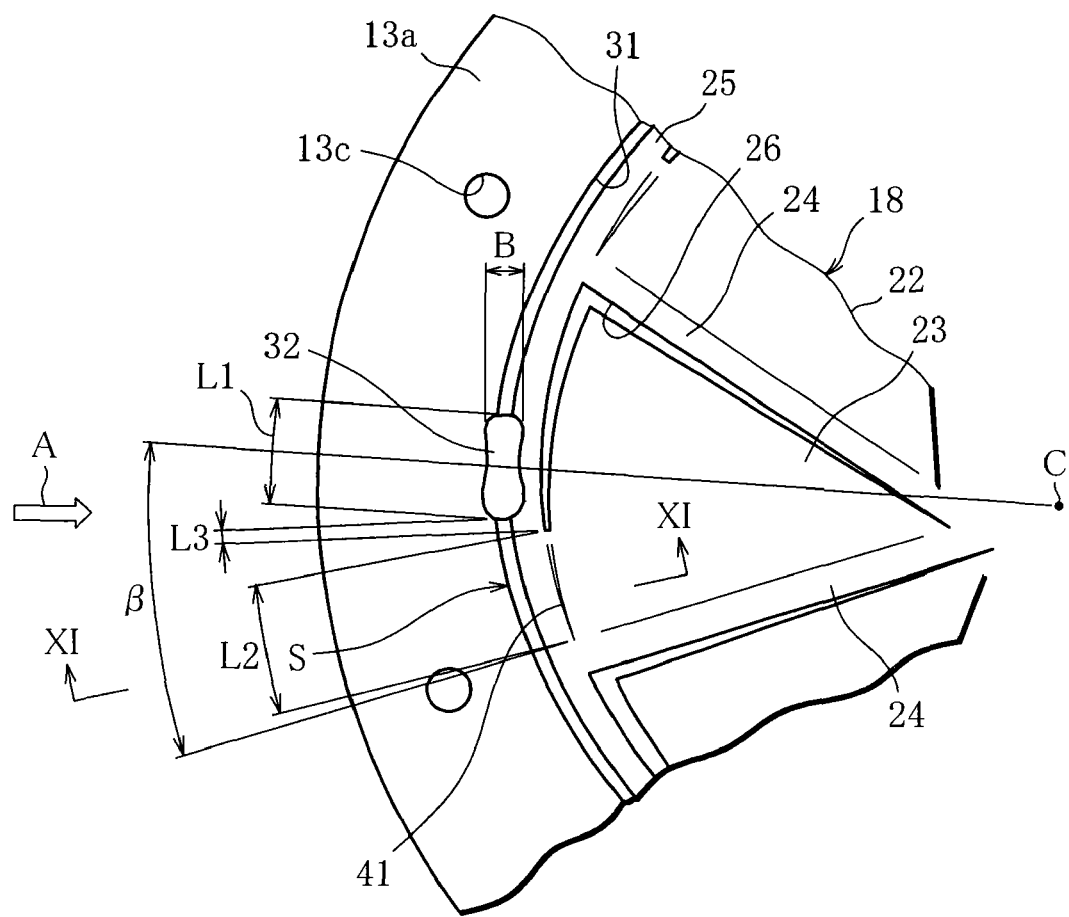
FIG. 9 is an enlarged partial view of the fin device according to the second embodiment, as viewed from the exhaust upstream side.
Figure 10:
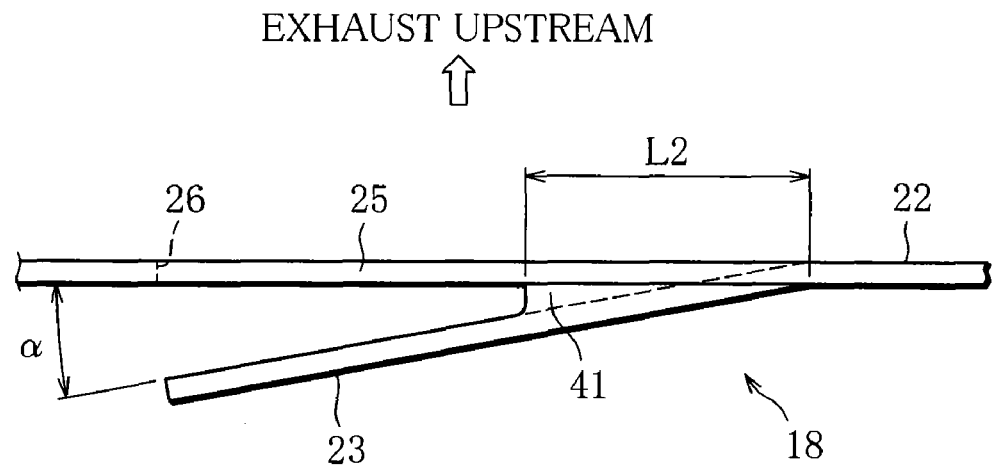
FIG. 10 shows the details of a connecting portion, as viewed from the direction of arrow A in FIG. 9.
Figure 11:
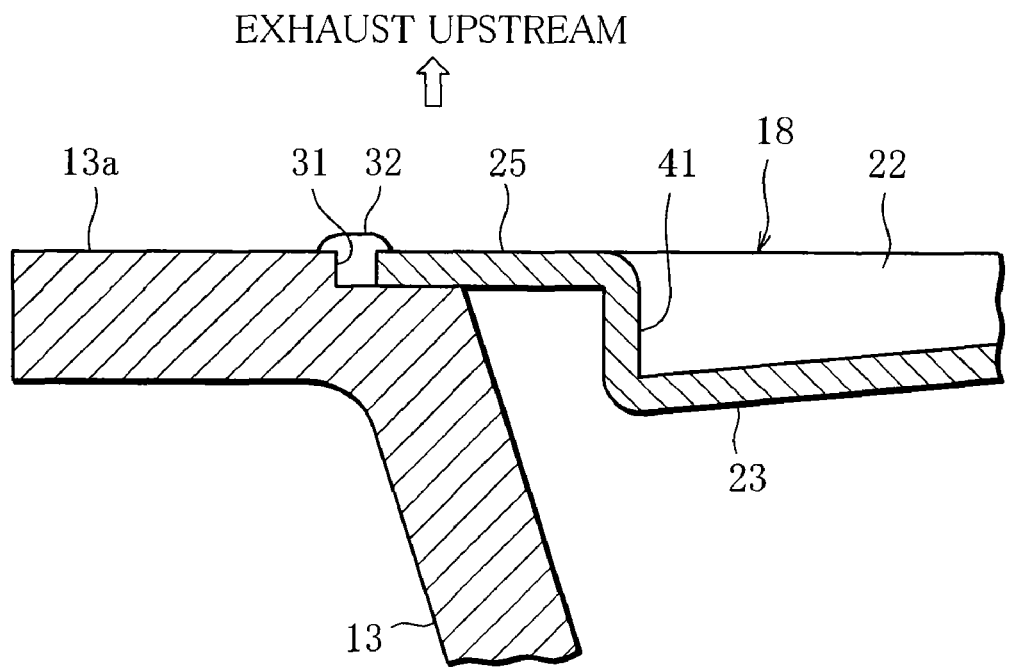
FIG. 11 is a sectional view showing the details of the connecting portion, taken along line XI-XI in FIG. 9.

FIG. 7 is an exploded perspective view of the fin device 18 and the mixing chamber 13 according to the present embodiment, as viewed from the exhaust downstream side. FIG. 8 is an assembled perspective view of the fin device 18 and the mixing chamber 13, as viewed from an exhaust upstream side. FIG. 9 is an enlarged partial view of the fin device 18 as viewed from an exhaust upstream side. FIG. 10 shows the details of a connecting portion, as viewed from the direction of arrow A in FIG. 9. FIG. 11 is a sectional view showing the details of the connecting portion, taken along line XI-XI in FIG. 9.

Since the fins 23 are bent from the base plate 22 as in the first embodiment, the fins 23 are detached from the rim portion 25 located on the outer circumference side of the fins 23 as shown in FIG. 5. In the second embodiment, however, especially as shown in FIGS. 9 to 11, outermost circumferential portions of the fins 23 are connected to an inner circumferential portion of the rim portion 25 through connecting portions 41 over given circumferential length L2 from the base ends of the fins 23. The connecting portions 41 are formed by plastically deforming the base plate 22 in an elongating direction along with relative displacement of two press dies at the time of press-molding of the base plate 22 without detaching the fins 23 from the rim portion 25. However, the connecting portions 41 do not have to be formed by this particular method. For example, the connecting portions 41 may be formed by welding separate plate pieces over the length L2 to between the outer circumferential edges of the fins 23 formed in the same manner as in the first embodiment and the inner circumferential edge of the rim portion 25.

In the second embodiment, the length L2 of the connecting portion 41 is set at 30 mm. Similarly to the first embodiment, the angle β indicative of the circumferential position of each of the weld beads 32 is set at 22.5 degrees. The length L1 of the weld bead 32 is set at 20 mm, and the width of the weld bead 32 at B. Due to the interrelationship of these factors, the connecting portion 41 and the weld bead 32 do not circumferentially overlap with each other, and are circumferentially detached from each other at distance L3 in the second embodiment as illustrated in FIG. 9. The second embodiment sets the distance L3 at 5.2 mm. Consequently, the percentage of the distance L3 is set at 26 percent of the length L1 of the weld bead 32.

In the exhaust purification device of the second embodiment thus configured, the formation of the gap S and the positioning of the weld beads 32 are identical to the first embodiment. Like the exhaust purification device of the first embodiment, the device of the second embodiment achieves the thermal stress-related function and advantages that absorb the expansion of the spoke portions 24, which is caused by exhaust heat, by the bowing of the rim portion 25 and thus modifies the concentration of stress on the base plate 22.

In addition, the exhaust purification device of the second embodiment offers the following function and advantages because of the connecting portions 41 provided to the fins 23.

The stress generated by the reaction force produced when the exhaust gas is guided is concentrated in the vicinity of the base ends of the fins 23, which are cantilevered by the spoke portions 24 of the base plate 22. The fan-like fins 23 guide more exhaust gas and then receive a larger reaction force at outer circumferential portions thereof. For this reason, stress is concentrated especially in the vicinity of the base ends of the fins 23 on the outermost circumference side. Accordingly, these areas are highly likely to get damaged. In the second embodiment, as an area corresponding to the close portion to the base end of the fin 23 on the outermost circumference side, an outermost circumferential edge of the fin 23, which extends from the base end of the fin 23 over circumferential length L, is connected to the inner circumference of the rim portion 25 through the connecting portion 41. In result, the stress applied to the above-mentioned portion is greatly reduced, and the fin device 18 is prevented from being damaged.

The fins 23 cantilevered by the spoke portions 24 have primarily low rigidity, and therefore, the natural frequencies of the fins 23 are also considerably low. In the second embodiment, however, since the fins 23 are connected to the rim portion 25 through the connecting portions 41, the support of the fins 23 in the base plate 22 is stronger than the simple cantilever support. The natural frequencies of the fins 23 are accordingly increased. Especially, the fan-like fins 23 most easily bow in the outermost circumference side when receiving exhaust pulsation. In the second embodiment, the outermost circumferential edges are connected to the rim portion 25 through the connecting portions 41, so that the natural frequencies of the fins 23 are effectively increased with the rigidity. In result, even if the engine 1 operates at upper limit speed, the pulsation frequency of the exhaust gas, which affects the fin device 18, does not reach the natural frequencies of the fins 23. It is then possible to prevent the damage of the fins 23, attributable to resonance.

TABLE 1 and FIG. 6 show the specifications and the test results of the fin device 18 of the second embodiment under "Second embodiment." The length L2 of the connecting portion 41 is set at 30 mm as described above, and the positional relationship between the connecting portion 41 and the corresponding weld bead 32 is designed so that they do not overlap with each other in the circumferential direction. Comparing to the first embodiment, the thermal stress is slightly increased in the second embodiment. On the other hand, the natural frequencies are greatly increased, and the surface pressure stress is drastically reduced. Again, this test result verifies that the formation of the connecting portions 41 increases the natural frequencies of the fins 23 and reduces the surface pressure stress.

Especially in the second embodiment, since the connecting portions 41 and the weld beads 32 do not circumferentially overlap with each other, when the spoke portions 24 are radially expanded due to exhaust heat, the rim portion 25 is unlikely to be hampered from bowing toward the outer circumference by the weld beads 32 through the connecting portions 41. As is apparent from the test results, it is possible to greatly improve characteristics related to the natural frequencies and the surface pressure stress, barely degenerating characteristics related to the thermal stress. Although a conclusion depends on which characteristics is emphasized among the thermal stress, the natural frequencies, and the surface pressure stress, the exhaust purification device of the second embodiment is capable of vastly improving a damage-preventing effect with respect to the fin device 18 as a whole, as compared to the device of the first embodiment.

As for the function and advantages of the connecting portions 41, roughly speaking, the longer the connecting portions 41 are, the lower the stress produced in fins 23 at the time of guiding the exhaust gas is, and the higher the natural frequencies of the fins 23 are, so that the possibility of resonance is reduced. Concerning the stress, the longer the connecting portions 41 are, the more reduced the concentration of stress is. As for the natural frequencies, however, it is required at least to set the natural frequencies of the fins 23 to be higher than the pulsation frequency of the exhaust gas in the upper limit speed of the engine 1 in order to prevent the resonance of the fins 23 from occurring in the entire speed region of the engine 1. To that end, there is a specific target value of the natural frequencies. For example, the second embodiment determines the natural frequencies in the following procedures.

The engine 1 of the second embodiment is a four-cycle in-line six-cylinder diesel engine. If the upper limit speed of the engine 1 is 2500 rpm, a pulsation frequency N(Hz) of the exhaust gas at the upper limit speed is obtained by the expression below.

$$N=(2500/60)\times(6/2)=125$$

In this case, the fins 23 of the fin device 18 receive an exhaust pulsation of 125 Hz at the maximum. Taking into account an excess length allowing for a length error of the connecting portions 41 or the like, the target value of the natural frequencies of the fins 23 is set at 150 Hz or higher. Tests were conducted, varying the length of the connecting portions 41. It was found that the length L2 of the connecting portion 41, which met the target value of the natural frequencies, was 30 mm.

The length of the connecting portions 41 does not necessarily have to be determined in view of the natural frequencies. The length of the connecting portions 41 may be determined, for example, on the basis of the stress produced in the vicinity of the base end of the fins 23 on the outermost circumference side.

The formation of the connecting portions 41 of the present embodiment prevents the damage on the fins 23. As to how much the connecting portions 41 affect an exhaust gas flow, the connecting portions 41 are merely small hindrance to the exhaust gas flow on the outermost circumference side of the fins 23. Since a flowing state of the exhaust gas on the outermost circumferential side of the fins 23 has little relation to generation of a swirl flow. For this reason, the fins 23 having the connecting portions 41 are capable of creating a swirl flow as in the case where the fins 23 are not provided with the connecting portions 41. For example, if the connecting portions 41 are formed in circumferentially facing openings of the fins 23, it is apparent that the exhaust gas flow is greatly hampered by the connecting portions 41, and that a proper swirl flow cannot be created. By contrast, according to the exhaust purification device of the second embodiment, the fin device 18 fulfills its primary function of agitating the exhaust gas without causing the foregoing trouble. The formation of the connecting portions 41 does not induce an increase in pressure drop, and therefore does not trigger a deterioration in engine performance, either.

In the second embodiment, the connecting portions 41 are formed simultaneously with the press-molding of the fin device 18. This simplifies the process of fabricating the fin device 18 and reduces the production cost. Furthermore, the connecting portions 41 formed by plastic deformation have high reliability because they do not cause a trouble such as weld separation, for example, as seen in a case where separate plate pieces are welded onto the base plate 22.

In the second embodiment, the positional relationship between the connecting portions 41 and the respective weld beads 32 is designed so that there is no overlap therebetween in the circumferential direction. By changing the positional relationship between the connecting portions 41 and the respective weld beads 32, it is possible to change the characteristics related to the thermal stress, natural frequency, and surface pressure stress of the fin device 18. The following description explains the third embodiment in which the connecting portions 41 and the respective weld beads 32 overlap with each other in the circumferential direction.

As stated above, the third embodiment differs from the second embodiment in terms of the positional relationship between the connecting portions 41 and the respective weld beads 32. The other constituents are identical. The constituents identical to those of the second embodiment will be provided with identical reference marks, and explanations thereof will be omitted. The following description refers chiefly to the difference from the second embodiment.

Figure 12:
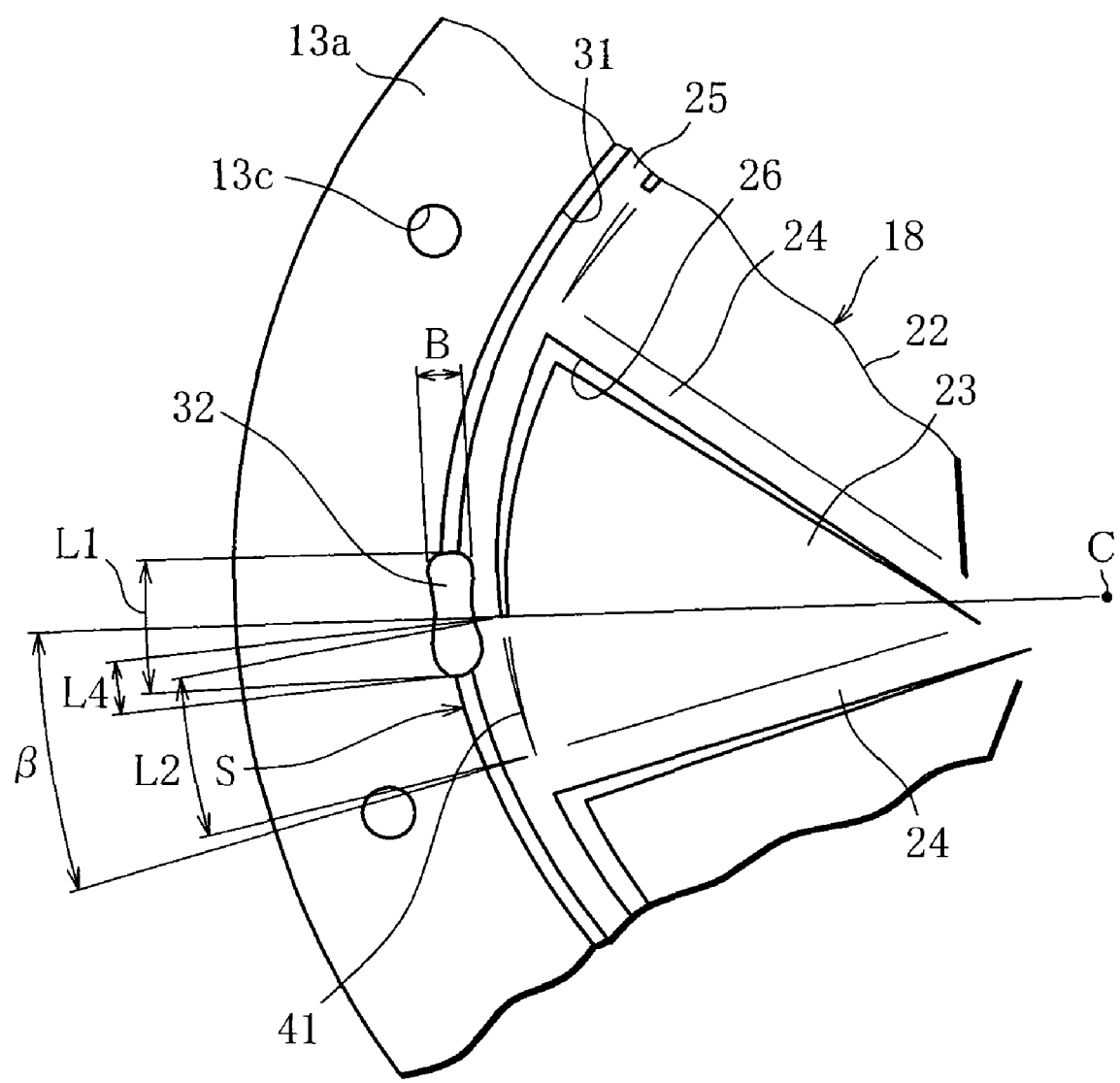
FIG. 12 is an enlarged partial view of the fin device according to a third embodiment, as viewed from the exhaust upstream side.

FIG. 12 is an enlarged partial view of the fin device 18 according to the third embodiment, as viewed from the exhaust upstream side.

According to the third embodiment, in order to overlap the connecting portions 41 with the respective weld beads 32, the angle β indicative of the circumferential position of the weld bead 32 is changed from 22.5 degrees applied in the second embodiment to 15 degrees. Since the angle β is thus determined, the weld beads 32 are placed closer to the respective connecting portions 41 in the circumferential direction. Consequently, the connecting portions 41 and the respective weld beads 32 overlap with each other in the circumferential direction by the amount of distance L4. In the third embodiment, the distance L4 is 10.75 mm. Inevitably, the distance L4 is 54 percent of the length L1 of the weld bead 32.

In the thus constructed exhaust purification device of the third embodiment, the connecting portions 41 and the respective weld beads 32 overlap with each other in the circumferential direction unlike the second embodiment. In an area where the connecting portion 41 overlaps with the corresponding weld bead 32 in the circumferential direction, the fin 23, the connecting portion 41, the rim portion 25, and the weld bead 32 are continuously located in the order from the center of the base plate 22 toward the outer circumference thereof. Such configuration acts in a direction slightly hampering the outward bowing of the rim portion 25 when the spoke portions 24 stretch in the radial direction due to exhaust heat, and is therefore somewhat disadvantageous in terms of thermal stress. On the other hand, the above configuration is advantageous in terms of natural frequency and surface pressure stress because the rigidity of the fin device 18 is increased.

TABLE 1 and FIG. 6 show the specifications and test results of the fin device 18 of the third embodiment under "Third embodiment." As is clear from the test results, compared with the second embodiment, although the characteristics related to thermal stress is slightly degenerated, those related to natural frequency and surface pressure stress are improved in the third embodiment. As described, the second and third embodiments are different from each other in terms of the characteristics related to thermal stress, natural frequency, and surface pressure stress. Nonetheless, both the embodiments bring a remarkable improvement in the effect of preventing the damage of the fin device 18 by comparison with the first embodiment. Depending upon which factor is to be emphasized, it may be determined whether or not the connecting portions 41 and the weld beads 32 should overlap with each other in the circumferential direction.

Especially, as is evident from TABLE 1 and FIG. 6, the distinctive characteristics related to thermal stress, natural frequency, and surface pressure stress are obtained in the second embodiment where the separation distance L3 between the connecting portion 41 and the corresponding weld bead 32 is set at 5.2 mm, and in the third embodiment where the overlapping distance L4 of the connecting portion 41 and the corresponding weld bead 32 is set at 10.75 mm. In this respect, it is desirable that the positional relationship between the connecting portions 41 and the respective weld beads 32 should be set at values between both the embodiments. To be concrete, if the values are given in percentage based upon the length L1 of the weld bead 32, an upper limit of the circumferential separation distance L3 between the connecting portion 41 and the corresponding weld bead 32 is 26 percent, and an upper limit of the circumferential overlapping distance L4 between the connecting portion 41 and the corresponding weld bead 32 is 54 percent. The positional relationship between the corresponding portion 41 and the weld bead 32 may be determined within this range. Needless to say, the same holds for the case where L3 and L4 are zero, at which the connecting portion 41 and the corresponding weld bead 32 are neither separated from nor overlapped with each other in the circumferential direction.

This is the end of the description of the embodiments of the invention. However, an aspect of the invention is not limited to the foregoing. For example, in the embodiments, the invention is applied to the exhaust purification device of the engine 1 having the SCR catalyst 16 for removing NOx and purifying exhaust gas. However, the invention can be applied to an engine having an after-treatment device that requires the supply of a reducing agent, and may be applied, for example, to a gasoline engine.

The after-treatment device may be, for example, an absorption-type NOx catalyst that absorbs NOx contained in exhaust gas. The invention may be applied to an engine that requires a NOx purge that is periodically carried out by injecting fuel as the reducing agent into the exhaust passage in order to release the absorbed NOx from the NOx catalyst to reduce the NOx. In this case, referring to FIG. 1, the SCR catalyst 16 is replaced with the absorption-type NOx catalyst, and a configuration in which fuel, instead of urea-water, is injected from the injection nozzle 19 is employed. Such configuration offers the function and advantages obtained by the positioning of the weld beads 32 as in the embodiments.

Although, in the embodiments, the weld beads 32 are each placed between the respective two circumferentially adjacent spoke portions 24, this is not the only way to arrange the weld beads 32. For example, it is also possible to dispose each of the weld beads 32 in every other space between the circumferentially adjacent spoke portions 24 or two of the weld beads 32 between the respective two adjacent spoke portions 24.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust purification device for an engine comprising:
   an after-treatment device interposed in an exhaust passage of an engine for purifying exhaust gas of the engine by using a reducing agent;
   a reducing-agent supply device that supplies a reducing agent into the exhaust passage on an upstream side of the after-treatment device; and
   a fin device interposed in the exhaust passage to be located upstream from the after-treatment device that agitates the exhaust gas of the engine by changing a flow direction of the exhaust gas that is passing through the fin device;
   wherein the fin device includes a base plate having a plurality of through holes that are defined by radially extending spoke portions and a ring-like rim portion connecting outer ends of the spoke portions, and are arranged in a circular pattern in a circumferential direction of the base plate, the base plate being fixed in the exhaust passage by the rim portion being jointed to the exhaust passage via welded portions, a plurality of fins that expand in one arranging direction of the through holes from base ends that are first edges of the spoke portions in the one arranging direction on a slant with respect to the base plate, and change a flow direction of the exhaust gas passing through the through holes to agitate the exhaust gas, and connecting portions that connect outermost circumferential edges of the fins to the rim portion over predetermined regions expanding from the base ends of the fins in extending directions of the fins; and wherein the welded portions are each disposed in an area between respective two adjacent spoke portions in the circumferential direction of the base plate, an outer edge of the rim portion in extending directions of the spoke portions is located next to the exhaust passage with a gap provided therebetween, the connecting portions are formed away from the welded portions in the circumferential direction of the base plate, and the distance between each of the connecting portions and the corresponding closest welded portion in a circumferential direction of the base plate is set equal to or less than 26 percent of the length of the welded portion in the circumferential direction of the base plate.

2. The exhaust purification device for an engine according to claim 1, wherein the fins are formed by cutting and bending portions of the base plate so that the rim portion, the through holes and the spoke portions are formed.

3. The exhaust purification device for an engine according to claim 1, wherein the welded portions are each disposed in the middle area between the respective two adjacent spoke portions in the circumferential direction of the base plate.

4. The exhaust purification device for an engine according to claim 1, wherein the exhaust passage has a flange to be connected to another exhaust passage positioned in the upstream or downstream side of the exhaust passage; and the rim portion of the base plate is fixed to the flange through the welded portions.

5. The exhaust purification device for an engine according to claim 1, wherein regions where the connecting portions are formed are determined so that a natural frequency of the fin device is set higher than a pulsation frequency of exhaust gas at the upper limit speed of the engine.

6. An exhaust purification device for an engine comprising:
an after-treatment device interposed in an exhaust passage of an engine for purifying exhaust gas of the engine by using a reducing agent;
a reducing-agent supply device that supplies a reducing agent into the exhaust passage on an upstream side of the after-treatment device; and
a fin device interposed in the exhaust passage to be located upstream from the after-treatment device that agitates the exhaust gas of the engine by changing a flow direction of the exhaust gas that is passing through the fin device;

wherein the fin device includes a base plate having a plurality of through holes that are defined by radially extending spoke portions and a ring-like rim portion connecting outer ends of the spoke portions, and are arranged in a circular pattern in a circumferential direction of the base plate, the base plate being fixed in the exhaust passage by the rim portion being jointed to the exhaust passage via welded portions, a plurality of fins that expand in one arranging direction of the through holes from base ends that are first edges of the spoke portions in the one arranging direction on a slant with respect to the base plate, and change a flow direction of the exhaust gas passing through the through holes to agitate the exhaust gas, and connecting portions that connect outermost circumferential edges of the fins to the rim portion over predetermined regions expanding from the base ends of the fins in extending directions of the fins; and wherein the welded portions are each disposed in an area between respective two adjacent spoke portions in the circumferential direction of the base plate, an outer edge of the rim portion in extending directions of the spoke portions is located next to the exhaust passage with a gap provided therebetween, each of the connecting portions overlaps with the corresponding closest welded portions in the circumferential direction of the base plate, and the overlapping length of the connecting portion and the corresponding welded portion in the circumferential direction of the base plate is set equal to or less than 54 percent of the length of the welded portion in the circumferential direction of the base plate.

7. The exhaust purification device for an engine according to claim 6, wherein the fins are formed by cutting and bending portions of the base plate so that the rim portion, the through holes and the spoke portions are formed.

8. The exhaust purification device for an engine according to claim 6, wherein the welded portions are each disposed in the middle area between the respective two adjacent spoke portions in the circumferential direction of the base plate.

9. The exhaust purification device for an engine according to claim 6, wherein the exhaust passage has a flange to be connected to another exhaust passage positioned in the upstream or downstream side of the exhaust passage; and the rim portion of the base plate is fixed to the flange through the welded portions.

10. The exhaust purification device for an engine according to claim 6, wherein regions where the connecting portions are formed are determined so that a natural frequency of the fin device is set higher than a pulsation frequency of exhaust gas at upper limit speed of the engine.

* * * * *